(12) United States Patent
Mehta et al.

(10) Patent No.: US 9,152,570 B2
(45) Date of Patent: Oct. 6, 2015

(54) SYSTEM AND METHOD FOR SUPPORTING FINER-GRAINED COPY-ON-WRITE PAGE SIZES

(75) Inventors: Bhavesh Mehta, Mountain View, CA (US); Benjamin C. Serebrin, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 403 days.

(21) Appl. No.: 13/406,144

(22) Filed: Feb. 27, 2012

(65) Prior Publication Data

US 2013/0227248 A1    Aug. 29, 2013

(51) Int. Cl.
 *G06F 12/10*   (2006.01)

(52) U.S. Cl.
 CPC ............ *G06F 12/1027* (2013.01); *G06F 12/10* (2013.01); *G06F 12/1009* (2013.01)

(58) Field of Classification Search
 CPC .......... G06F 12/1009; G06F 2212/652; G06F 12/30914; G06F 2009/45583; G06F 12/1027; G06F 12/08; G06F 12/109; G06F 12/145; G06F 12/0292; G06F 12/10; G06F 12/1063; G06F 2212/2022; G06F 2212/651; G06F 2212/655; G06F 2212/657; G06F 2201/815
 USPC ............ 711/6, 202, 203, 205, 206, 207, 122, 711/133, E12.024, E12.043, E12.059, 711/E12.077, 103, 104, 159, 209, E12.068, 711/E12.061, E12.014, E12.065, 100, 117, 711/163, E12.002, 208, E12.001, E12.058, 711/120, 121, 145, 153, 200, 221; 718/1; 714/763; 365/185.33
 See application file for complete search history.

(56) References Cited

U.S. PATENT DOCUMENTS

| | | | | |
|---|---|---|---|---|
| 3,825,904 A | * | 7/1974 | Burk et al. | 711/207 |
| 3,829,840 A | * | 8/1974 | Burk et al. | 711/207 |
| 4,500,952 A | * | 2/1985 | Heller et al. | 711/206 |
| 5,379,391 A | * | 1/1995 | Belsan et al. | 711/114 |
| 5,479,627 A | * | 12/1995 | Khalidi et al. | 711/205 |
| 5,875,483 A | * | 2/1999 | Tremblay | 711/210 |
| 6,493,812 B1 | * | 12/2002 | Lyon | 711/207 |
| 6,504,493 B1 | * | 1/2003 | Burd | 341/50 |
| 6,662,280 B1 | * | 12/2003 | Hughes | 711/156 |
| 8,117,418 B1 | * | 2/2012 | Metcalf et al. | 711/203 |
| 2004/0117593 A1 | * | 6/2004 | Uhlig et al. | 711/207 |
| 2004/0215919 A1 | * | 10/2004 | Emmes | 711/208 |
| 2006/0294519 A1 | * | 12/2006 | Hattori et al. | 718/1 |
| 2007/0214340 A1 | * | 9/2007 | Leveille et al. | 711/203 |
| 2009/0182976 A1 | * | 7/2009 | Agesen | 711/207 |
| 2009/0313445 A1 | | 12/2009 | Pandey et al. | |

(Continued)

OTHER PUBLICATIONS

AMD-V(tm) Nested Paging, White Paper, Revision: 1.0, Advanced Micro Devices, Inc., Jul. 2008.

(Continued)

*Primary Examiner* — Tuan Thai
*Assistant Examiner* — Edward Waddy, Jr.

(57) ABSTRACT

In a computer system having virtual machines, one or more unused bits of a guest virtual address range are allocated for aliasing so that multiple virtually addressed sub-pages can be mapped to a common memory page. When one bit is allocated for aliasing, sub-pages can be virtually addressed at a granularity that is one-half of a memory page. When M bits are allocated for aliasing, sub-pages can be virtually addressed at a granularity that is $1/(2^M)$-th of a memory page. The granularity of page sizes can be selected according to particular use cases. In the case of COW optimization, page sizes can be set statically between 4 KB and 2 MB or configured dynamically among multiple page sizes.

22 Claims, 11 Drawing Sheets

(56) References Cited

U.S. PATENT DOCUMENTS

| | | | |
|---|---|---|---|
| 2010/0122062 A1* | 5/2010 | Hummel et al. | 711/205 |
| 2010/0223447 A1* | 9/2010 | Serebrin | 712/225 |
| 2011/0047546 A1* | 2/2011 | Kivity et al. | 718/1 |
| 2012/0036334 A1* | 2/2012 | Horman et al. | 711/165 |
| 2013/0080726 A1* | 3/2013 | Kegel et al. | 711/163 |

OTHER PUBLICATIONS

K. Adams, et al., "A Comparison of Software and Hardware Techniques for x86 Virtualization," Proceedings of ASPLOS XII, Oct. 2006.

R. Bhargava, et al., "Accelerating Two-Dimensional Page Walks for Virtualized Systems," Proceedings of ASPLOS XIII, Mar. 2008.

M. Ben-Yehuda, et al., "The Turtles Project: Design and Implementation of Nested Virtualization,"Proceedings of 9th USENIX Symposium on Operating Systems Design and Implementation, Oct. 2010.

Benjamin C. Serebrin et al., U.S. Appl. No. 13/096,755, filed Apr. 28, 2011, entitled, "Increasing Granularity of Dirty Bit Information".

Benjamin C. Serebrin et al., U.S. Appl. No. 13/185,008, filed Jul. 18, 2011, entitled, "Increasing Granularity of Dirty Bit Information in Hardware Assisted Memory Management Systems".

\* cited by examiner

SYSTEM AND METHOD FOR SUPPORTING FINER-GRAINED COPY-ON-WRITE PAGE SIZES

BACKGROUND

Modern computers employ virtual memory to decouple processes, e.g., applications running on top of an operating system, from the physical memory addresses backing the address space of the processes. Using virtual memory enables processes to have a large contiguous address space, and allows the computer to run more processes than can fit simultaneously in their entirety in the available physical memory (i.e., to "over-commit" memory). To do this, virtual memory space is divided into pages of a fixed size (for example, x86 architectures use page sizes of 4 KB, 2 MB, or 1 GB), and each page of the virtual memory space may or may not be mapped onto a page within the physical memory of the same page size. Much of the description in this patent will be in terms of x86 architectures. However, a person of skill in the art will understand how to apply the teachings of the invention to other processor architectures.

Translation of a virtual memory address to a physical memory address is done by traversing page tables in memory that contain mapping information. To speed up translation, a translation look-aside buffer (TLB) is typically used. The TLB provides faster translation of virtual addresses to physical addresses than does accessing page tables in memory because the TLB can provide the beginning-to-end mapping in a single step, and because the TLB can be implemented in a small (and, therefore, fast to access) data structure closer to or in the CPU itself. However, the TLB is limited in size and it is possible that a virtual memory page cannot be found in the TLB. Whenever this happens, a "TLB miss" occurs, and the mapping must be performed by a traversal of the page tables, commonly known as a "page walk," a much slower process than look-ups in the TLB.

In virtualized computer systems, where multiple virtual machines, each having an operating system and applications running therein, can be configured to run on a single hardware platform, memory management for the virtual machines is carried out by the emulated memory management units (MMUs). One emulated MMU is provided for each virtual machine and the emulated MMU manages the mappings of guest virtual addresses directly to physical memory addresses, also referred to as machine memory addresses, using shadow page tables. Shadow page tables have the same structure as conventional page tables and, as with conventional page tables, shadow page tables need not be traversed if the guest virtual address that needs to be mapped has an entry in the TLB.

Memory management for the virtual machines may also be carried out by MMUs configured in CPUs that support nested page walks. In such systems, a first set of page tables, referred to herein as guest page tables (gPTs), map the virtual address space of each application running in the virtual machines, referred to herein as guest virtual address space, to a physical address space that has been emulated for a virtual machine, referred to herein as guest physical address space. Additionally, a second set of page tables, referred to herein as nested page tables (NPTs) (also known as extended page tables), map the guest physical address space to the address space of machine memory, referred to herein as machine memory address space. Both the first and second sets of page tables are hierarchically arranged and a pointer to the top-level, root table for each set of page tables is stored in a distinct register. In x86 architectures that support nested page walks, the register that stores a pointer to the root table of the gPTs is known as the gCR3 register and the register that stores a pointer to the root table of the NPTs is known as the nCR3 register. It should be recognized that non-x86 architectures employing guest page tables and nested page tables, or the like, may have different structures and accessed in a different manner.

FIG. 1 is a schematic diagram that illustrates nested page walks in a virtualized computer system. In the example of FIG. 1, a guest virtual address 100 is being mapped by MMU 101 to a machine memory address of data 150 stored in machine memory 102 using gPTs 110 and NPTs 120, which are also stored in machine memory 102. Contents of gPTs 110 at all levels include pointers, expressed as guest physical addresses, to guest page tables or guest memory pages, and also permission bits, level bits, and other control bits, and in some implementations, accessed and dirty bits. Contents of NPTs 120 at all levels include pointers, expressed as machine memory addresses, to nested page tables or machine memory pages and also permission bits, level bits, and other control bits, and in some implementations, accessed and dirty bits.

The mapping begins with the guest page walker module of MMU 101 retrieving a pointer to the root table of gPTs 110 from the gCR3 register, which is an address in the guest physical address space. Bits [47:39] of guest virtual address 100 and 3 trailing bits of zeros define the index into the root table and are copied into the 12 least significant bits of this guest physical address. The resulting guest physical address, known as the gL4 address, is translated into a machine memory address using the nested page walker module of MMU 101 and NPTs 120, and the translated address is used to retrieve an address of the next lower-level (L3) table, which is also an address in the guest physical address space. Bits [38:30] of guest virtual address 100 and 3 trailing bits of zeros define the index into this L3 table and are copied into the 12 least significant bits of this guest physical address. The resulting guest physical address, known as the gL3 address, is translated into a machine memory address using the nested page walker module of MMU 101 and NPTs 120, and the translated address is used to retrieve an address of the next lower-level (L2) table, which is also an address in the guest physical address space. Bits [29:21] of guest virtual address 100 and 3 trailing bits of zeros define the index into this L2 table and are copied into the 12 least significant bits of this guest physical address. The resulting guest physical address, known as the gL2 address, is translated into a machine memory address using the nested page walker module of MMU 101 and NPTs 120, and the translated address is used to retrieve an address of the next lower-level (L1) table, which is also an address in the guest physical address space. Bits [20:12] of guest virtual address 100 and 3 trailing bits of zeros define the index into this L1 table and are copied into the 12 least significant bits of this guest physical address. The resulting guest physical address, known as the gL1 address, is translated into a machine memory address using the nested page walker module of MMU 101 and NPTs 120, and the translated address is used to retrieve an address of a data page, which is also an address in the guest physical address space. Bits [11:0] of guest virtual address 100 define the index into this data page and are copied into the 12 least significant bits of this guest physical address. The resulting guest physical address, known as the gPA address, is translated into a machine memory address using the nested page walker module of MMU 101 and NPTs 120, and the translated address is used to retrieve the desired content, i.e., data 150.

Copy-on-write (COW) is a commonly used optimization technique that operates at the granularity of pages. As mentioned above, x86 architectures employ page sizes of 4 KB, 2

MB, or 1 GB, and therefore COW may be implemented in x86 architectures using 4 KB page sizes, 2 MB pages sizes, or 1 GB page sizes. However, 4 KB page size may be finer granularity than what is needed in common workloads. A larger page size would be desirable because it would lower the pressure on the TLB. A 2 MB page size, however, is too coarse and cannot be easily shared to realize the benefits from COW optimization techniques. In addition, once a page is allocated as COW, a write to that page, even a single byte write, would force the entire page to be copied. From a computational efficiency point of view, smaller page sizes for COW optimization would be preferred because the computational overhead associated with such an event increases with larger page sizes. It may be possible to build x86 page tables with page sizes between 4 KB and 2 MB, but this might not be desirable because such a change could affect memory system performance adversely in other ways or be an implementation burden.

SUMMARY

One or more embodiments of the present invention provide techniques for increasing the granularity of page sizes so that page sizes can be selected according to particular use cases. In the use case of COW optimization, one or more embodiments of the present invention permit page sizes to be set statically between 4 KB and 2 MB, e.g., 64 KB, which has been empirically determined as a preferred page size for COW optimization, or configured dynamically among multiple page sizes.

A data structure according to an embodiment of the present invention includes a set of tables that are hierarchically arranged, the set of tables including a root table and a plurality of lower-level tables. One entry of the lower-level tables references a physical memory page, also referred to herein as machine memory page, in common with at least one other entry of the lower-level tables, and the entries each have an address value of the physical memory page and a bit value indicating that the address value is referencing a data page and not a location of another lower-level table.

A data structure according to another embodiment of the present invention is used by a memory management unit (MMU) of a computer system having virtual machines instantiated therein, where the MMU is configured to execute a first mapping from a guest virtual address space to a guest physical address space and a second mapping from the guest physical address space to a machine memory address space. The data structure includes a set of first mapping tables that are hierarchically arranged and define mappings between guest virtual addresses and guest physical addresses, and a set of second mapping tables that are hierarchically arranged and define mappings between guest physical addresses and machine memory addresses, the set of second mapping tables including a root table and a plurality of lower-level tables. One entry of the lower-level tables references a machine memory page in common with at least one other entry of the lower-level tables, and the entries each have an address value of the machine memory page and a bit value indicating that the address value is referencing a data page and not a location of another lower-level table.

A method of performing a write operation in a computer system having virtual machines instantiated therein, according to an embodiment of the present invention, includes the steps of receiving a write operation from a virtual machine, extracting a write target address from the write operation, modifying a binary representation of the write target address by copying the value of a first bit of the binary representation to a second bit of the binary representation, wherein the second bit is more significant than the first bit, translating the write target address to a machine memory address using the modified binary representation, determining that the write operation at the machine memory address is not permitted, copying the contents at the machine memory address to a different machine memory address and designating the different machine memory address to be writable, and performing the write operation at the different memory address.

Further embodiments of the present invention include, without limitation, a non-transitory computer-readable storage medium that includes instructions that enable a processing unit to implement one or more aspects of the above methods as well as a computer system configured to implement one or more aspects of the above methods.

DETAILED DESCRIPTION

Figure 1:
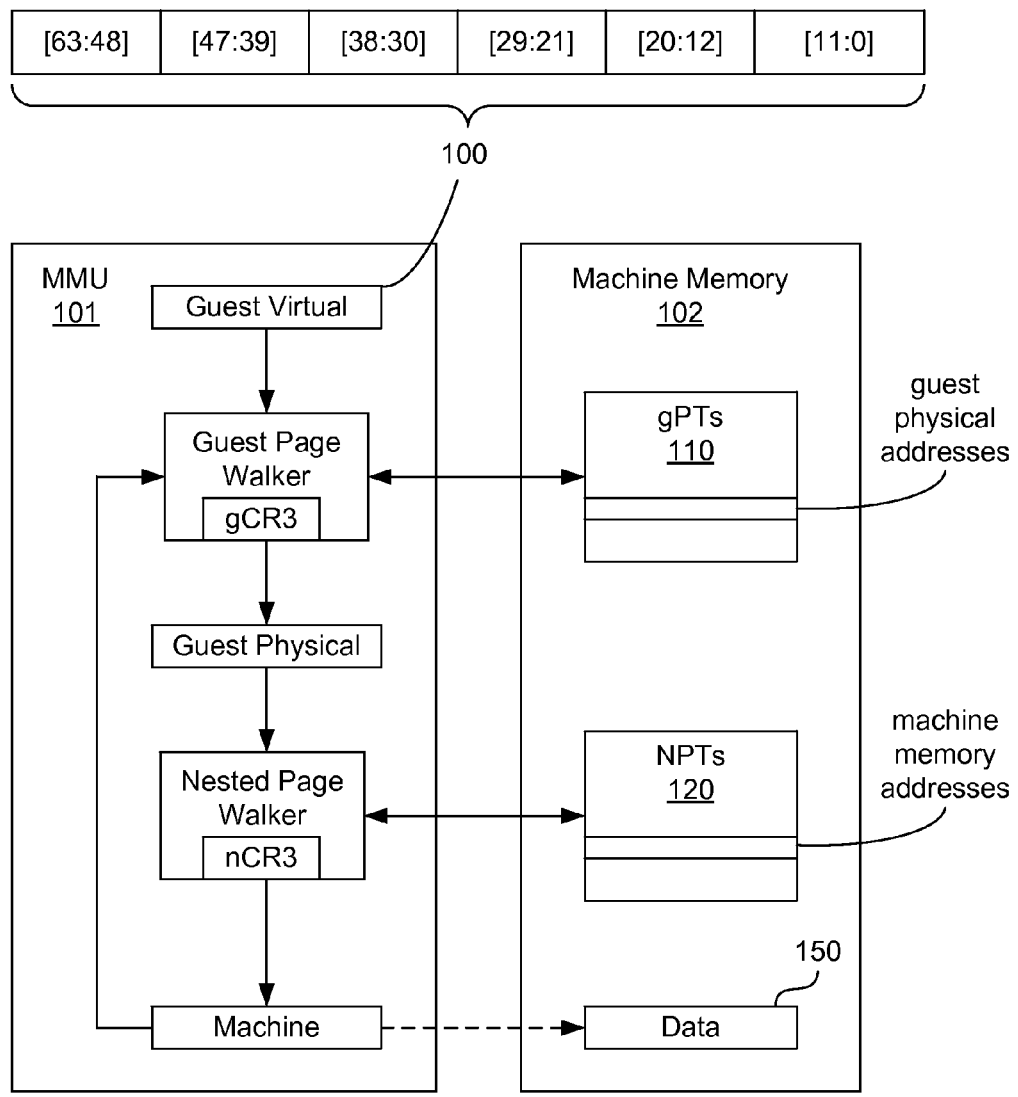
FIG. 1 is a schematic diagram that illustrates nested page walks in a virtualized computer system.
Figure 2A:
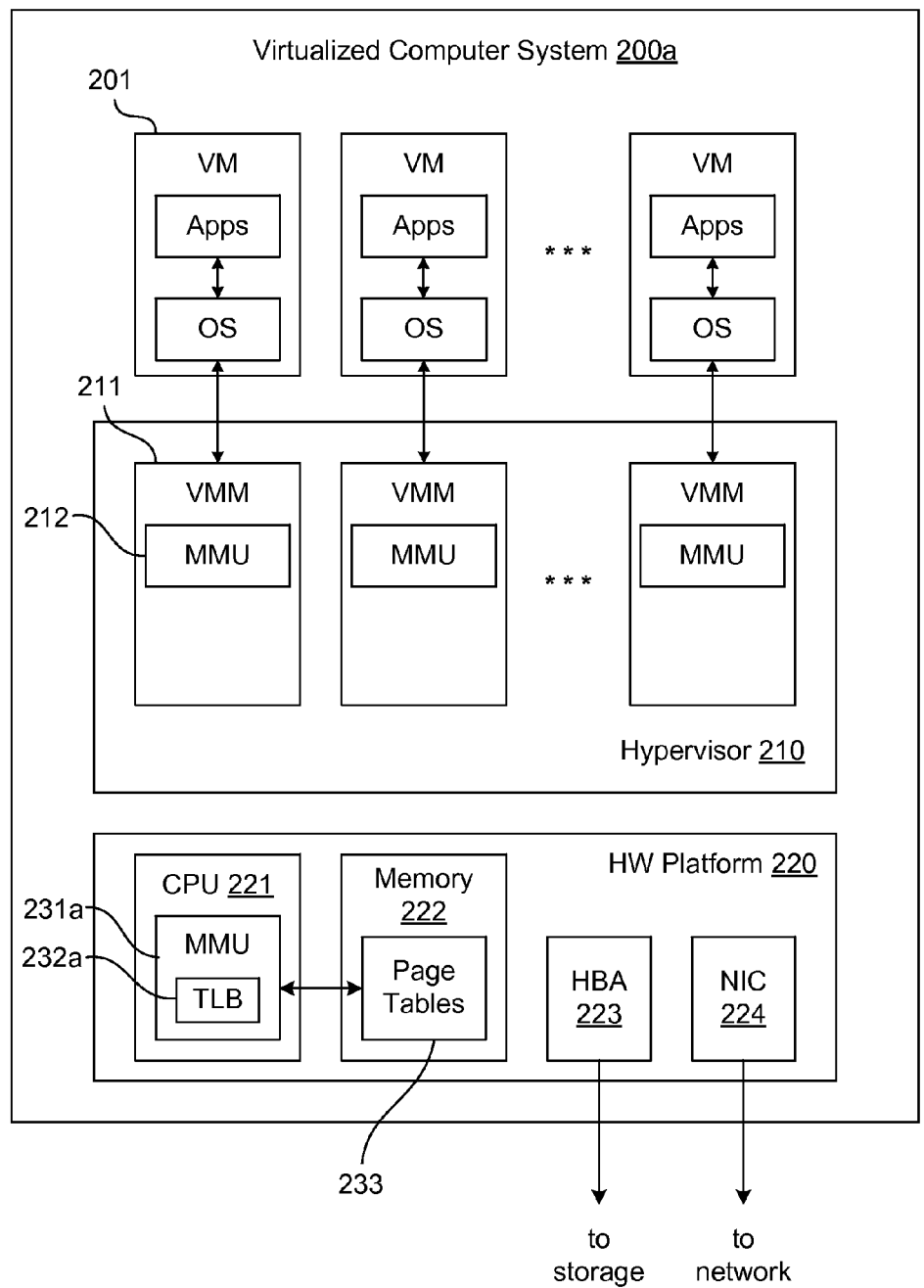
FIG. 2A depicts a block diagram of a virtualized computer system in which one or more embodiments of the present invention may be practiced.

FIG. 2A depicts a block diagram of a virtualized computer system in which one or more embodiments of the present invention may be practiced. Virtualized computer system 200a includes multiple virtual machines (VMs), including VM 201, that are running on top of hypervisor 210. Each VM is an abstraction of a physical computer system having virtual hardware resources and a guest operating system that provides guest applications running in the VM an interface to the virtual hardware resources. Hypervisor 210 includes a plurality of software layers including a kernel that manages hardware resources of hardware platform 220 through various drivers (not shown), and virtual machine monitors (VMMs) each emulating hardware resources, such as an MMU, for a corresponding one of VMs. In the example illustrated in FIG. 2, VMM 211 emulates MMU 212 for VM 201. Hardware platform 220 includes one or more central processing unit (CPU) 221, system memory 222, a host bus adapter (HBA) 223 that connects virtualized computer system 200a to a persistent storage unit such as a disk array, and a network interface card (NIC) 224 that connects virtualized computer system 200a to a network. CPU 221 has a memory management unit (MMU) 231a that carries out the mappings from the virtual address space to the physical address space using either a translation look-aside buffer (TLB) 232a or page tables 233 stored in system memory 222. TLB 232a may be implemented as a direct mapping TLB, set associative TLB, or fully associative TLB. In embodiments where TLB 232a is implemented as a direct mapping TLB or set associative TLB, a separate TLB is configured for each of the different page sizes handled by MMU 231a. In embodiments where TLB 232a is implemented as a fully associative TLB, on the other hand, a single TLB configuration may be employed. The page tables 233 stored in memory 222 include guest page tables and shadow page tables. Guest page tables are maintained by the guest operating system of a particular VM to provide mapping from guest virtual address space to guest physical address space. Shadow page tables are maintained by the VMM and provide mappings from the guest virtual address space directly to the physical address space of system memory 222.

Figure 2B:
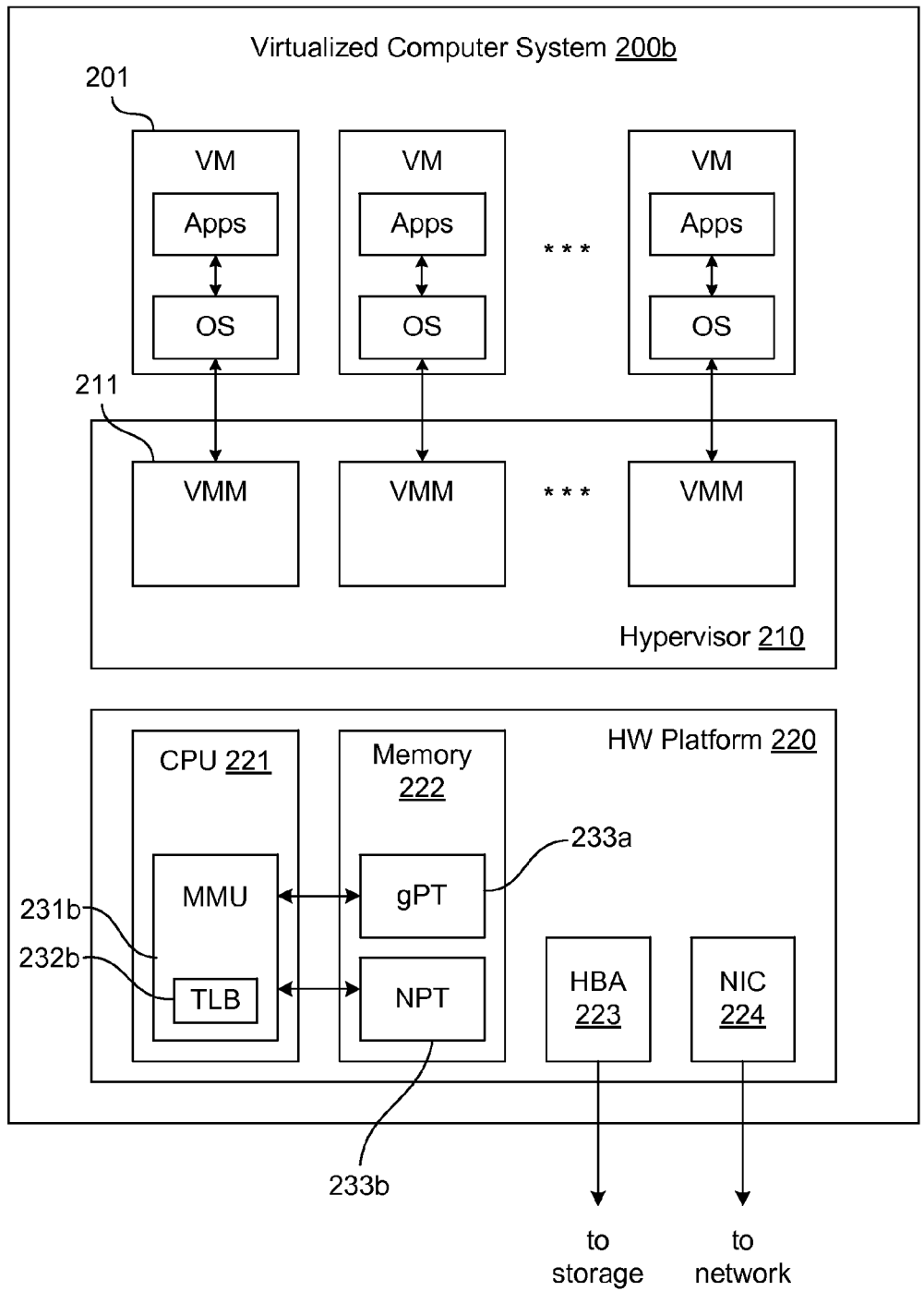
FIG. 2B depicts a block diagram of another virtualized computer system in which one or more embodiments of the present invention may be practiced.

FIG. 2B depicts a block diagram of another virtualized computer system in which one or more embodiments of the present invention may be practiced. Virtualized computer system 200b is configured in a similar manner to virtualized computer system 200a except as described below. In this embodiment, memory management for the VMs is carried out by MMU 231b. MMU 231b carries out the mappings from the guest virtual address space to the guest physical address space and from the guest physical address space to the machine memory address space using guest page tables (gPTs) 233a and nested page tables (NPTs) 233b stored in machine memory 222, or directly from the guest virtual address space to the machine memory address space using TLB 232b. As with TLB 232a, TLB 232b may be implemented as a direct mapping TLB, set associative TLB, or fully associative TLB. It should be recognized that gPTs 233a are maintained by the guest operating system of a particular VM to provide mapping from guest virtual address space to guest physical address space, and NPTs 233b are maintained by hypervisor 210 to provide mappings from the guest physical address space to the machine memory address space.

It should be recognized that the various terms, layers and categorizations used to describe the virtualization components in FIGS. 2A and 2B may be referred to differently without departing from their functionality or the spirit or scope of the invention. One example of hypervisor 210 that may be used is included as a component of VMware's vSphere product, which is commercially available from VMware, Inc. of Palo Alto, Calif. ("VMware"). It should further be recognized that other virtualized computer systems are contemplated, such as hosted virtual machine systems, where hypervisor 210 is implemented in conjunction with an operating system installed on hardware platform 220.

Figure 3A:
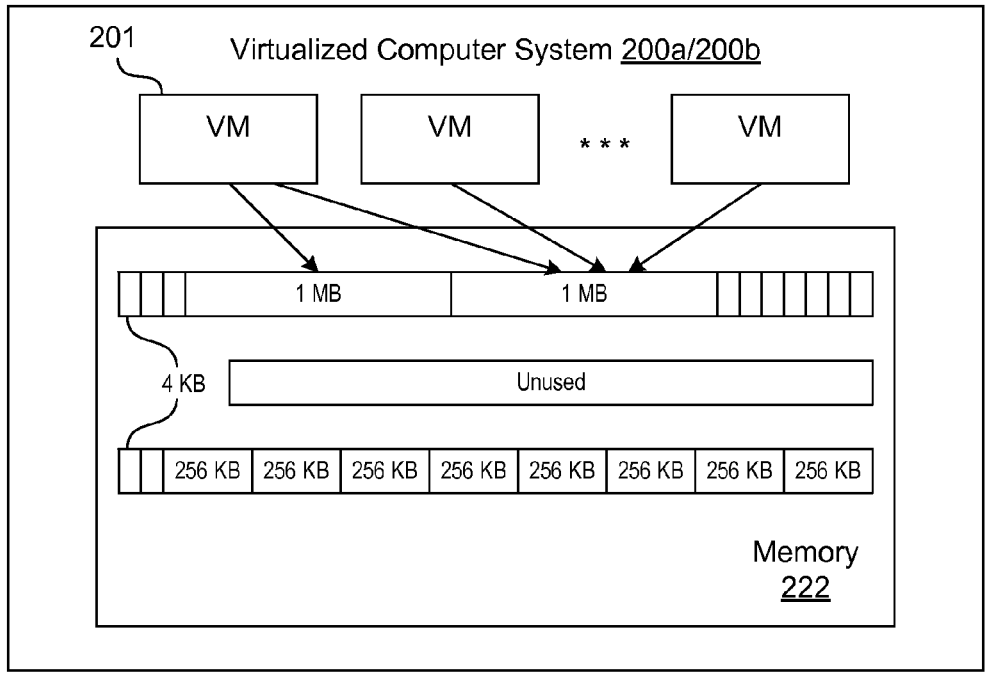
FIGS. 3A and 3B schematically illustrate machine memory pages of different sizes
Figure 3B:
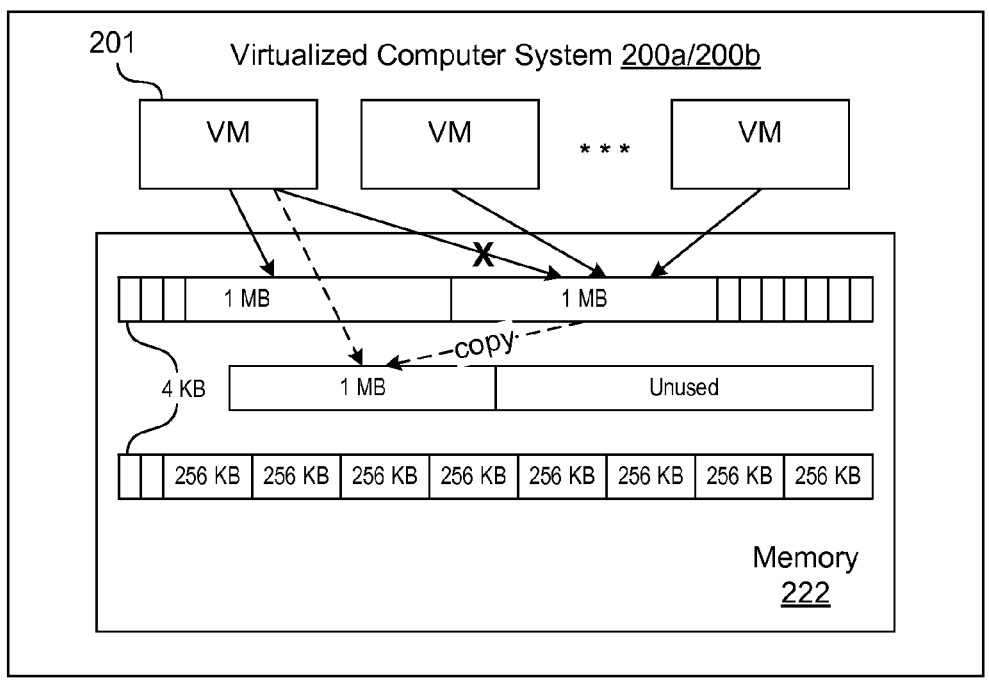

FIGS. 3A and 3B schematically illustrate machine memory pages of different sizes, e.g., 4 KB, 256 KB, and 1 MB, as managed by MMU 231a or MMU 231b. The 4 KB pages are accessed via a conventional 4-level page table walk. The 256 KB pages are accessed via a conventional 3-level page table walk to arrive at a 2 MB page and then employing techniques described below in conjunction with FIGS. 4 and 6A-6D to divide the 2 MB page into 256 KB pages. The 1 MB pages are accessed via a conventional 3-level page table walk to arrive at a 2 MB page and then employing techniques described below in conjunction with FIGS. 4 and 6A-6D to divide the 2 MB page into 1 MB pages.

FIGS. 3A and 3B also show an example of what happens when a 1 MB page that is shared by multiple VMs, e.g., as a result of COW optimization, is modified by one of the VMs. FIG. 3A shows three VMs sharing a single 1 MB page. In one example, the 1 MB page is a page full of zeroes, and each of the three VMs allocated a 1 MB guest memory page for later use, as a result of which they became mapped to this 1 MB page. FIG. 3B shows what happens when one of the three VMs writes to a guest memory page that is mapped to this shared page. First, the contents of the shared page are copied to a new page at an unused memory location, and a mapping from the guest memory page is changed from the shared page to this new page. Then, this new page is updated in accordance with the write operation from the VM.

Figure 4:
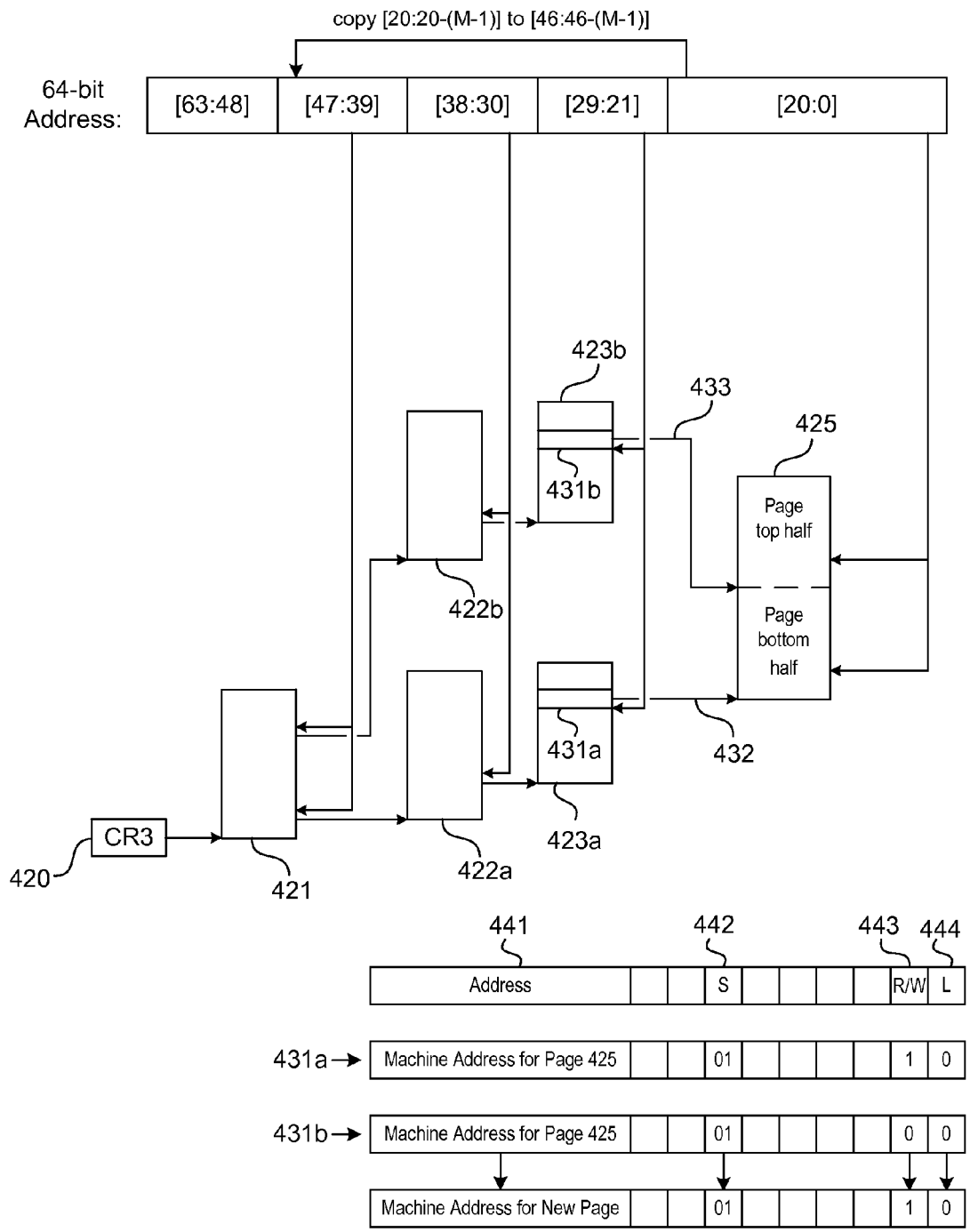
FIG. 4 is a schematic illustration of page tables used in one or more embodiments of the present invention to access a memory page that is of a non-conventional page size.

FIG. 4 is a schematic illustration of page tables used in one or more embodiments of the present invention to access a memory page that is of a non-conventional page size, e.g., between 4 KB and 2 MB. The page tables shown in FIG. 4 are shadow pages tables maintained by a VMM of a corresponding VM and are arranged hierarchically. They include a single root table 421 having entries containing pointers to multiple second-level tables including page tables 422a, 422b, each having entries containing pointers to multiple third-level tables including page tables 423a, 423b, each having entries (e.g., 431a, 431b) containing pointers to memory pages (e.g., data page 425). Entries of third-level tables include an address 441 that functions as a pointer to a memory page, which may be a fourth-level page table or a data page. The entries of third-level tables further include one or more bits (S) 442 for indicating page size (e.g., '00'=2 MB page size; '01'=1 MB page size; '10'=256 KB page size; and '11'=64 KB page size), a read/write bit 443 ('0'=read only; and '1'=read/write), and a level bit (L) 444 for indicating that there is no additional level of page walk when L is 1 and that there is an additional level of page walk when L is 0. In the case where the third-level table page entry references a fourth-level page table, the corresponding level bit would be set to 0. In the case where the third-level table page entry references a data page, the corresponding level bit would be set to 1. The size bits may be stored in any of bits [19:12] for non-fourth-level pages or bits [62:48] for all cases, or the size may be specified in a global control register.

The MMU (e.g., MMU 231a) obtains the location of root table 421 by accessing a register 420 (e.g., CR3 register in x86 architectures). Then, successive 9-bit segments of the binary representation of the virtual address are used to index into the page tables at different levels. In the embodiment described herein, where the 2 MB page is divided into 1 MB pages that are separately addressable, the 20 least significant bits of the binary representation of the virtual address are used as an offset into data page 425. Bits [63:48] are not used in the mapping in this embodiment as is the convention in memory management schemes for x86 architectures.

The structure of the page tables shown in FIG. 4 is the same as conventional page tables. However, during memory accesses, before mapping a virtual address to a physical address, values of M most significant bits from bits [20:0] of the virtual address are respectively copied into bit [46] to bit [46-(M−1)] of the virtual address. For example, if M is two, the values of bits [20:19] are copied into bits [46:45]. This copying may be performed by the MMU of a processor, for example, or by a hypervisor through the use of binary translation. Thus, for example, existing x86 processors may be modified to perform this copying when performing memory accesses. This copying creates $2^M$ aliased virtual address regions within the page tables. The contents of corresponding entries of third-level tables in multiple aliased virtual address regions (e.g., third-level table 423a and third-level table 423b) are configured to reference the same data page (e.g., data page 425).

If M is one, as is the case when a 2 MB page is divided into two 1 MB pages, corresponding entries from two different third-level tables reference different portions of the same data page, the entry from the third-level table corresponding to a value of zero at bit [20] referencing the bottom half of the data page and the entry from the third-level table corresponding to a value of one at bit [20] referencing the top half of the data page. Thus, for example, referring to FIG. 4, second-level table 422a and third-level table 423a correspond to bit [20] (and therefore also bit [46]) having a value of zero; while second-level table 422b and third-level table 423b correspond to bit [20] (and therefore also bit [46]) having a value of one.

If M is two, corresponding entries from four third-level tables reference different portions of the same data page and each such entry is associated with a distinct quarter section of the data page, each such section having a size of 512 KB. More generally, if M is N, corresponding entries from $2^N$ third-level tables reference different portions of the same data page and each such entry is associated with a distinct $1/2^N$ section of the data page, each such section having a size of 2 MB/$2^N$. Thus, if M is 5, the 2 MB page would be divided into 32 separately addressable 64 KB sections.

It should be recognized that the page sizes can be changed according to particular use cases by changing the value of M. For example, in the case of COW optimization, if it is determined that the efficiency gained from COW optimization is small, the value of M may be increased. However, the larger values of M and thus, smaller page sizes, may increase the TLB pressure too much. Therefore, if the TLB pressure is too high, the value of M may be decreased accordingly until a good balance between COW optimization and TLB pressure is achieved.

In FIG. 4, entries 431a, 431b each have L bit 444 set as '1' indicating that these entries are pointing to a data page (as distinguished from a page table) and that the referenced data page is 1 MB in size (since S='01'). However, R/W bit 443 is set as '1' for entry 431a and as '0' for entry 432b. This means that the portion of the data page referenced by entry 431a is read/write and unique to a guest (not shared), whereas the portion of the data page referenced by entry 431b is read only and can be shared. Therefore, it should be recognized that a 2 MB page that is referenced by a third-level table can have one portion (e.g., bottom half portion referenced by 431a) designated as read/write and another portion (e.g., upper half portion referenced by 431b) designated as read-only. As a result, COW optimization techniques can be employed at a granularity of 1 MB, which is greater than 4 KB (resulting from a 4-level page table walk) but less than 2 MB (resulting from a 3-level page table walk). When a write memory access is issued to a shared portion of a data page, e.g., the portion referenced by entry 431b, the contents of this shared data page portion are copied to a new data page by hypervisor 210, and address 441 stored in entry 431b is changed from the address of data page 425 to the address of the new data page. In addition, R/W bit 443 of entry 431b is changed from '0' to '1' so that the write memory access can be carried out on this new data page.

In an alternative embodiment, a hardware configuration register, whose bits [47:21] can be set or cleared by hypervisor 210, is provided. For each bit that is set in this bit vector, the corresponding bit of the virtual address is claimed as an alias bit. So if M bits are set in this configuration register, there are $2^M$ aliases. The hardware will then copy bits [20:(20-(M-1))] into the bit positions of the virtual address corresponding to the bits that are set in the hardware configuration register, from highest-to-lowest. The bits that are set to 1 in the hardware configuration register need not be contiguous.

In a further embodiment of the present invention, the check for permitting aliasing can be configurable. In this further embodiment, a pair of hardware registers is provided to specify the aliasing acceptance requirements for each bit that is claimed as an aliasing bit. For each aliasing bit M, the two corresponding bits in these hardware registers can be configured to select from the following rules: (00) bit M must be zero; (01) bit M must match sign bit [47]; (10) bit M must match the inverse of sign bit [47]; and (11) bit M must be one.

Figure 5:
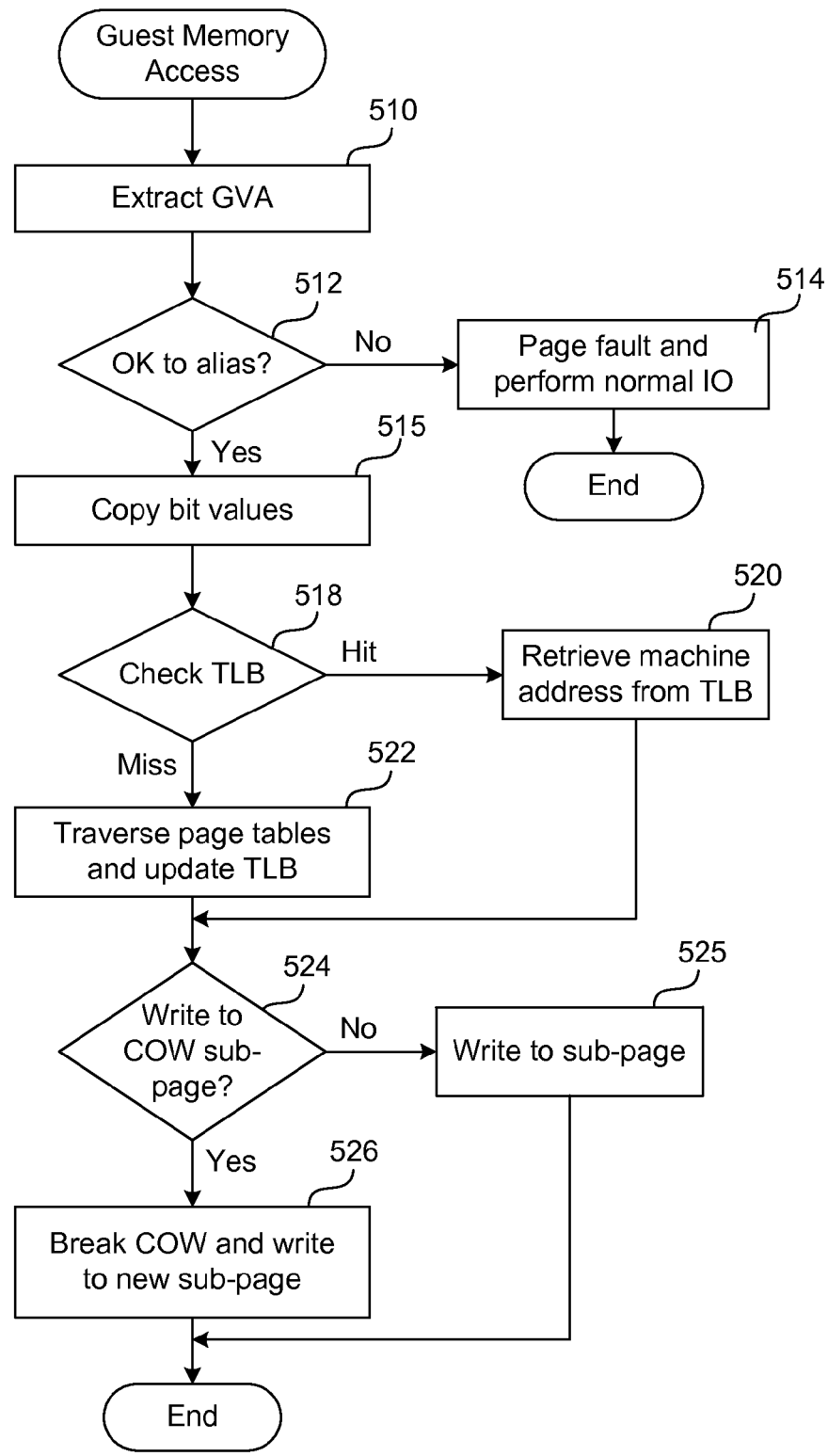
FIG. 5 is a flow diagram that illustrates the method for performing a guest memory access, according to an embodiment of the present invention.
Figure 6A:
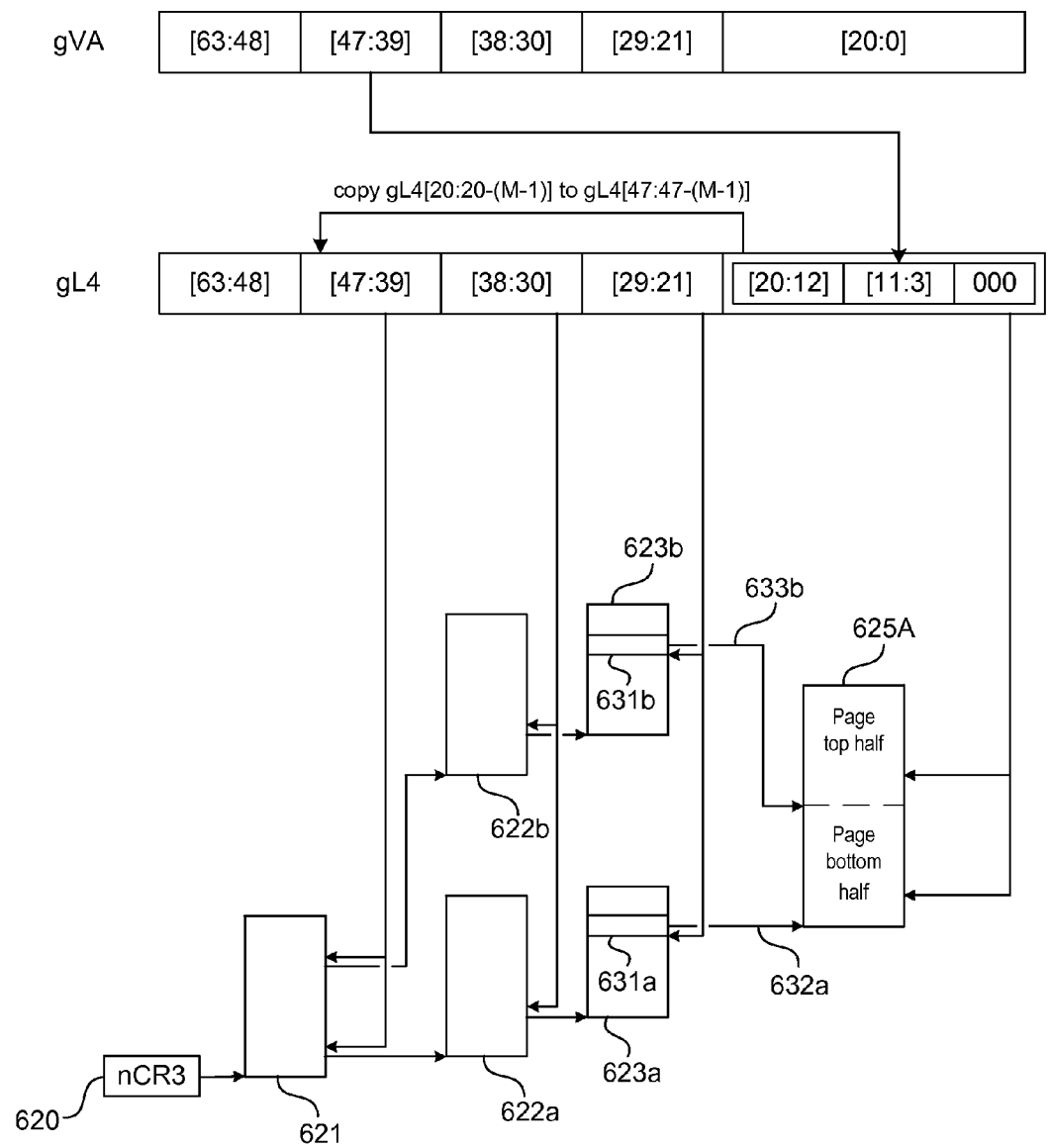
FIGS. 6A-6D are schematic diagrams that illustrate nested page walks that are carried out according to one or more embodiments of the present invention to access a memory page that is of a non-conventional page size.
Figure 6B:
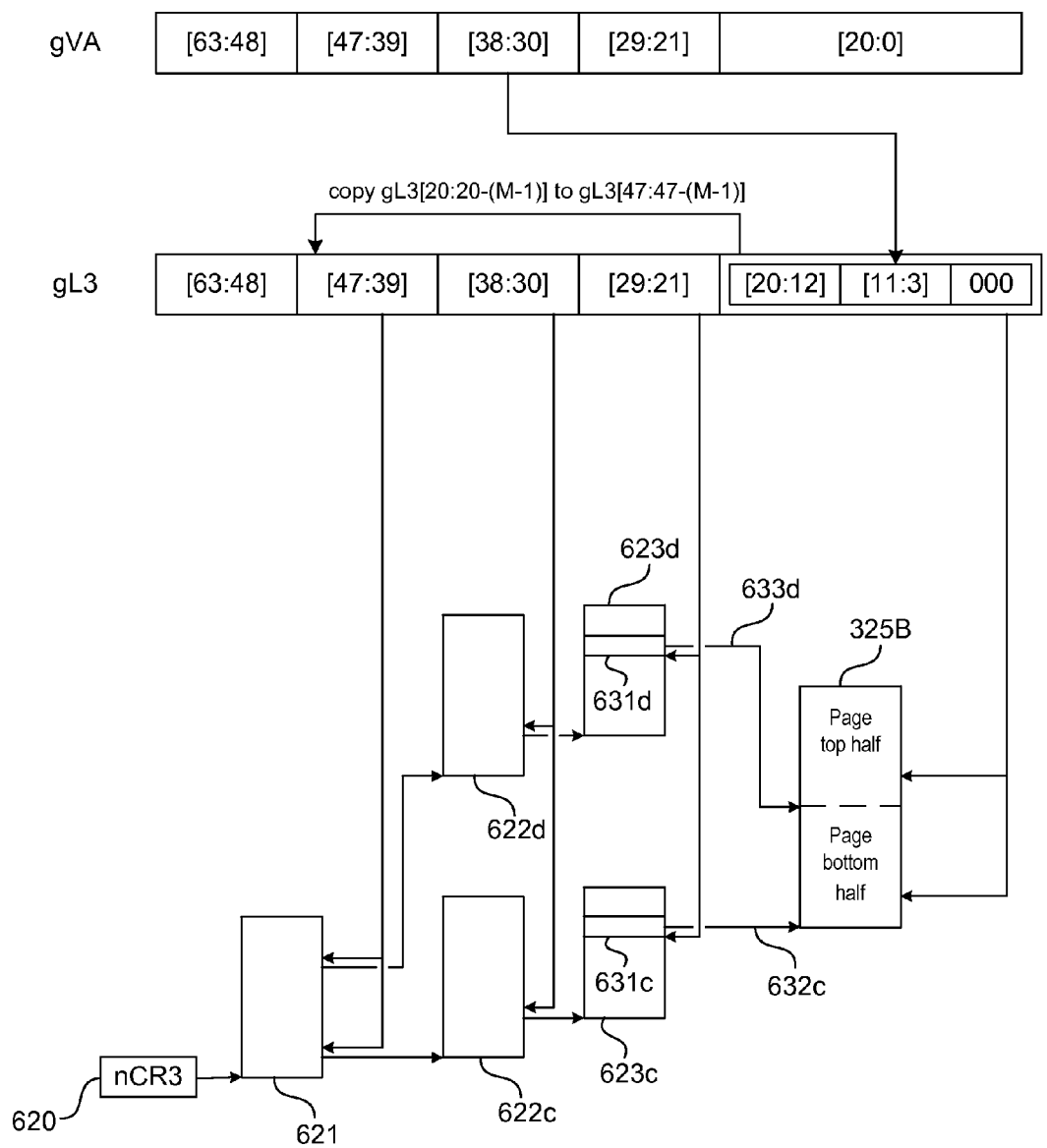
Figure 6C:
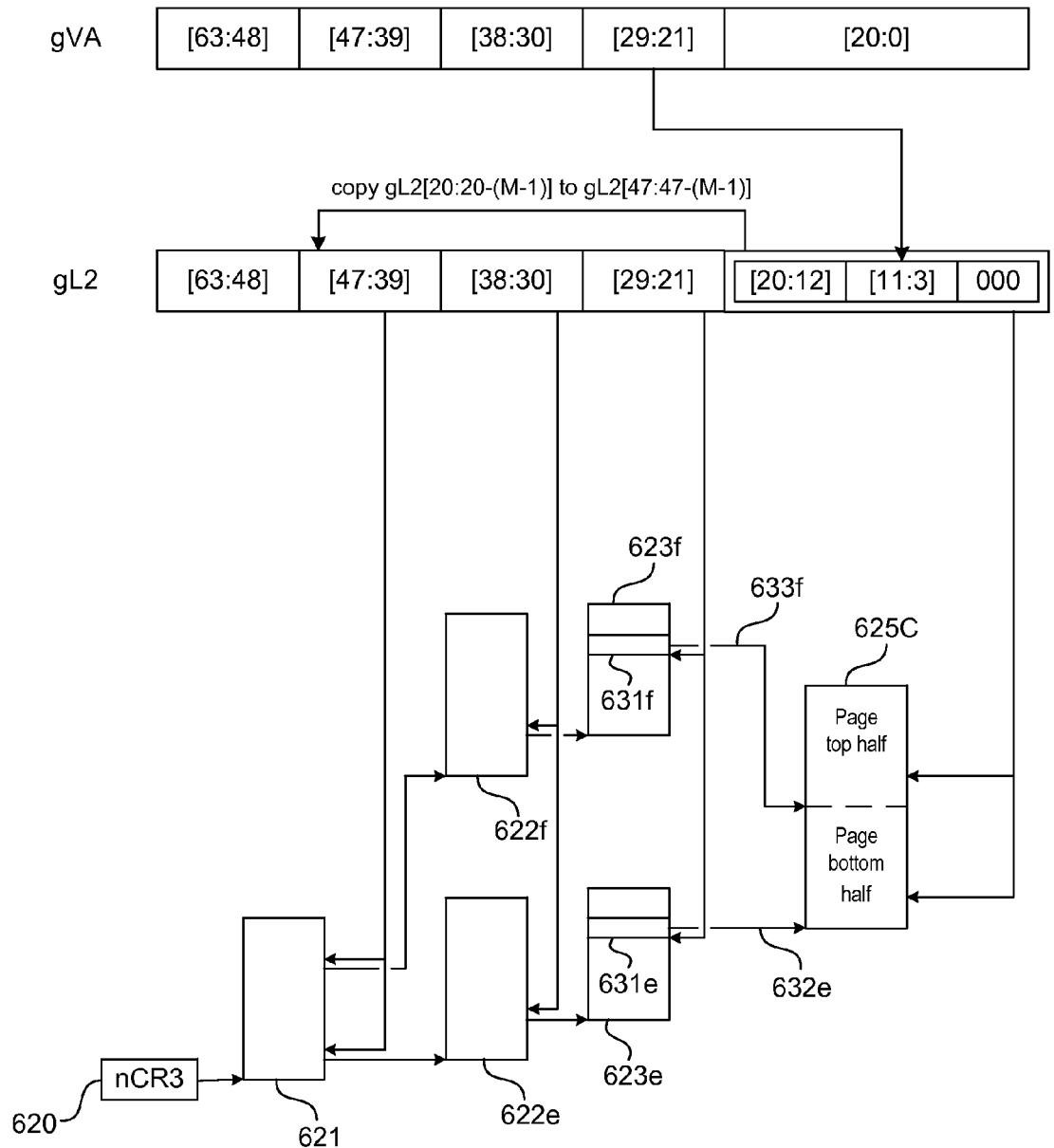
Figure 6D:
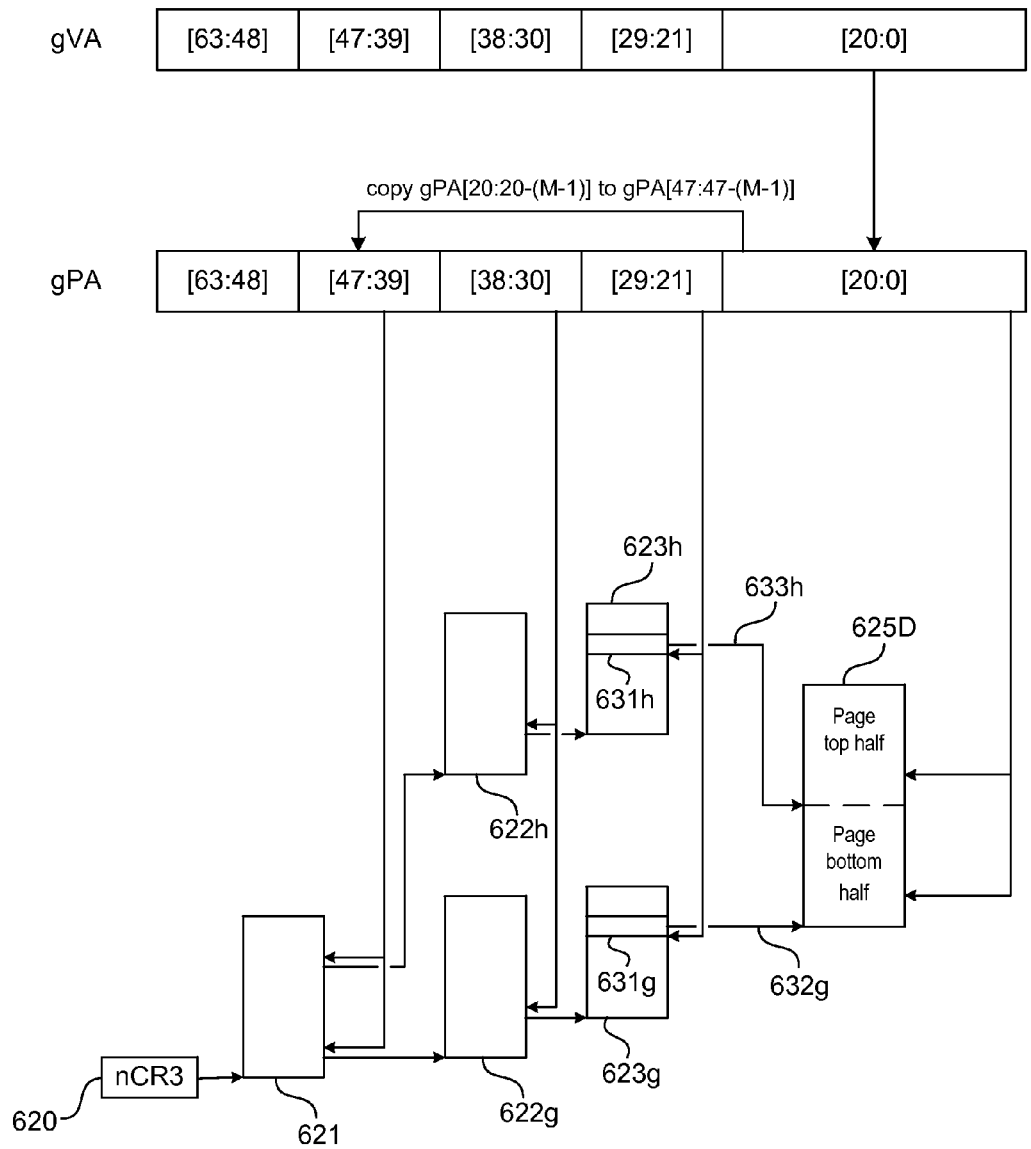

FIG. 5 is a flow diagram that illustrates the method for performing a guest memory access, according to an embodiment of the present invention. The guest memory access may be a read memory access or a write memory access. In the embodiment illustrated herein, the MMU (e.g., MMU 231a) is performing a mapping from a guest virtual address space to a machine address space using TLB (e.g., TLB 232a) or page tables (e.g., page tables 233).

At step 510, the MMU extracts the guest virtual address contained in the guest memory access in binary form. At step 512, the MMU checks to see if the creation of $2^M$ aliased virtual address regions within the page tables is permitted by confirming that bits [46:46-(M-1)] of the guest virtual address, hereinafter called "virtual address bits for aliasing," have values equal to the sign bit at bit [47] of the guest virtual address. If the virtual address bits for aliasing do not have values equal to the sign bit, aliasing is not permitted and the method proceeds to step 514, where a page fault occurs and normal guest memory access is performed after the virtual address translation is carried out by the VMM. The method terminates after step 514. If the virtual address bits for aliasing have values that are equal to the sign bit, aliasing is permitted and the method proceeds to step 515, where the values of M most significant bits from bits [20:0] are respectively copied into bit [46] to bit [46-(M-1)].

The TLB is checked at step 518 to see if it contains a mapping for the modified virtual address, in particular bits [47:21] of the modified virtual address. In embodiments where the TLB is implemented as a direct mapping TLB or set associative TLB, and a separate TLB is configured for each of the different page sizes handled by MMU 231a, a separate check is made for each of the different TLBs. If the TLB contains the mapping, step 520 is carried out where the MMU retrieves the machine address that the TLB associates with the guest virtual address and the method continues onto the decision block at step 524. If the TLB misses at step 518, the MMU, at step 522, traverses the page tables to obtain the machine address associated with the guest virtual address and updates the TLB to associate the machine address obtained from the page walk to the guest virtual address. The method then continues onto the decision block at step 524. In the embodiment described herein, it should be recognized that the machine address retrieved from the TLB at step 520 or obtained from the page walk at step 522 represents the start of a data page having the size of 2 MB.

At step 524, the MMU determines whether or not the guest memory access is a write memory access to a portion of the data page (referred to hereinafter as a "sub-page") that has been designated copy-on-write by examining the read/write bit of the entry in the TLB or the page table, that includes a pointer to (i.e., an address of) the data page. If the read/write bit is set as '1' indicating that a write to the sub-page is permitted, step 525 is carried out and the write memory access is carried out in the normal manner. On the other hand, if the read/write bit is set as '0' indicating that a write to the sub-page is not permitted, step 526 is carried out. At step 526, the VMM causes the contents of the sub-page that is read-only to be copied to a new sub-page memory location, and the pointer to the sub-page stored in the page tables and the TLB is changed to the address of the new sub-page memory location. In addition, R/W bit 443 of the corresponding page table and TLB entry is changed from '0' to '1' and a write memory access is carried out on the new sub-page.

FIGS. 6A-6D are schematic diagrams that illustrate nested page walks according to one or more embodiments of the present invention when a memory page that is of a non-conventional page size, e.g., between 4 KB and 2 MB, is being accessed. The nested page walks shown in FIGS. 6A-6D are carried out in one or more embodiments of the present invention when MMU 231b carries out a mapping of a guest virtual address to a machine memory address. Such mapping begins with the guest page walker module of MMU 231b retrieving a pointer to the root (L4) table of gPTs 233a from the gCR3 register, which is an address in the guest physical address space, and copying bits [47:39] of the guest virtual address and 3 trailing bits of zeros into the 12 least significant bits of this guest physical address. The resulting guest physical address, known as the gL4, is translated into a machine memory address according to the nested page walk shown in FIG. 6A. The guest page walker module of MMU 231b then retrieves an address of the next lower-level (L3) table, which is also an address in the guest physical address space, using the translated address, and copies bits [38:30] of the guest virtual address and 3 trailing bits of zeros into the 12 least significant bits of this retrieved address. The resulting guest physical address, known as the gL3 address, is translated into a machine memory address according to the nested page walk shown in FIG. 6B. The guest page walker module of MMU 231 then retrieves an address of the next lower-level (L2) table, which is also an address in the guest physical address space, using the translated address, and copies bits [29:21] of the guest virtual address and 3 trailing bits of zeros into the 12 least significant bits of this retrieved address. The resulting guest physical address, known as the gL2 address, is translated into a machine memory address according to the nested page walk shown in FIG. 6C. The guest page walker module of MMU 231 then retrieves an address of the next lower-level (L1) table, which is also an address in the guest physical address space, using the translated address, and copies bits [20:0] of the guest virtual address into the 20 least significant bits of this retrieved address. The resulting guest physical address, known as the gL1 address, is translated into a machine memory address according to the nested page walk shown in FIG. 6D. In the embodiment described herein, the machine memory address translated from the gL1 address represents the machine memory address of a data page. Other embodiments may have additional levels of guest page table walk.

Page tables depicted in FIGS. 6A-6D are arranged hierarchically. They include a single root table 621 having entries containing pointers to multiple second-level tables 622 (including tables 622a-622h), each having entries containing pointers to multiple third-level tables 623 (including tables 623a-623h). Entries of third-level tables 623 contain pointers 632, 633 (including pointers 632a, 632c, 632e, 632g, 633b, 633d, 633f, 633h) to machine memory pages 625 (e.g., machine memory page 625A-D). In addition, these entries each have a machine address of the corresponding machine page, and S, RW, and P bits. In each of FIGS. 6A-6D, the MMU (e.g., MMU 231b) obtains the location of root table 621 by accessing a register 620 (e.g., nCR3 register). Then, successive 9-bit segments of the binary representation of an address to be translated are used to index into the page tables at different levels. The 20 least significant bits of the binary representation of the guest physical address are used as an offset into machine memory page 625. Bits [63:48] are not used in the mapping in this embodiment as is the convention in memory management schemes for x86 architectures. However, bits [51:48] are defined as available extension bits of a physical address range. It should be clear to a person of skill in the art that an L5 table can be added, with corresponding extension of the page walks described herein, to enable translations of 52-bit guest physical addresses.

The structure of nested page tables shown in FIGS. 6A-6D is the same as conventional page tables. However, before mapping a guest physical address (e.g., gL4 in FIG. 6A, gL3 in FIG. 6B, gL2 in FIG. 6C, and gL1 in FIG. 6D) to a machine memory address, aliasing of the bits of the guest physical address is performed, if permitted. Aliasing is permitted in one or more embodiments of the present invention if the bit or bits that are being aliased have zero values.

In one embodiment of the present invention, when aliasing is permitted, values of M bits of the guest physical address are respectively copied into bits [47:47-(M−1)] of the guest physical address. For example, if M is two, the values of bits [20:19] from the guest physical address are copied into bits [47:46]. This copying is performed by MMU 231b. Thus, for example, existing x86 processors may be modified to perform this copying when performing memory accesses. This copying creates $2^M$ aliased physical address regions within the nested page tables. The contents of corresponding entries of bottom-level tables in multiple aliased physical address regions are configured to reference the same machine memory page (e.g., bottom-level tables 624g, 624h reference machine memory page 625D in FIG. 6D). If M is one, corresponding entries from two different bottom-level tables reference the same machine memory page, the entry from the bottom-level table corresponding to a value of zero at bit [20] being associated with the bottom half of the machine memory page and the entry from the bottom-level table corresponding to a value of one at bit [20] being associated with the top half of the machine memory page. Thus, for example, referring to FIG. 6D, second-level table 622g and bottom-level table 623g correspond to bit [20] (and therefore also bit [47]) having a value of zero; while second-level table 622h and bottom-level table 623h correspond to bit [20] (and therefore also bit [47]) having a value of one. It should be recognized that the values of the R/W bits of these entries may be different. This would happen if, as in the example shown in FIG. 6D, the bottom half of the machine memory page was designated read/write but the top half was designated read-only (e.g., pursuant to a copy-on-write optimization). This would also happen if the situation were reversed, where the bottom half of the machine memory page was designated read-only but the top half was designated read/write. If M is two, corresponding entries from four bottom-level tables reference the same machine memory page and each such entry is associated with a distinct quarter section of the machine memory page.

In the page table data structure illustrated in FIGS. 6A-6D, when M is one, two different guest physical addresses map to the same machine memory page. The difference in the binary representations of these two guest physical addresses is the modification performed as described above that copies the 20-th least significant bit (bit [20]) into a more significant bit. More generally, if M is N, corresponding entries from $2^N$ bottom-level tables reference the same data page and each such entry is associated with a distinct $1/2^N$ section of the data page, each such section having a size of $2\ MB/2^N$. Thus, if M is 5, the 2 MB page would be divided into separately addressable 64 KB sections.

In an alternative embodiment, a hardware configuration register, whose bits [47:21] can be set or cleared by hypervisor 210, is provided. For each bit that is set in this bit vector, the corresponding bit of the guest physical address is claimed as an alias bit. So if M bits are set in this configuration register, there are $2^M$ aliases. The hardware will then copy bits [20:20-(M−1)] into the bit positions of the guest physical address corresponding to the bits that are set in the hardware configuration register, from highest-to-lowest. The bits that are set to 1 in the hardware configuration register need not be contiguous.

Figure 7:
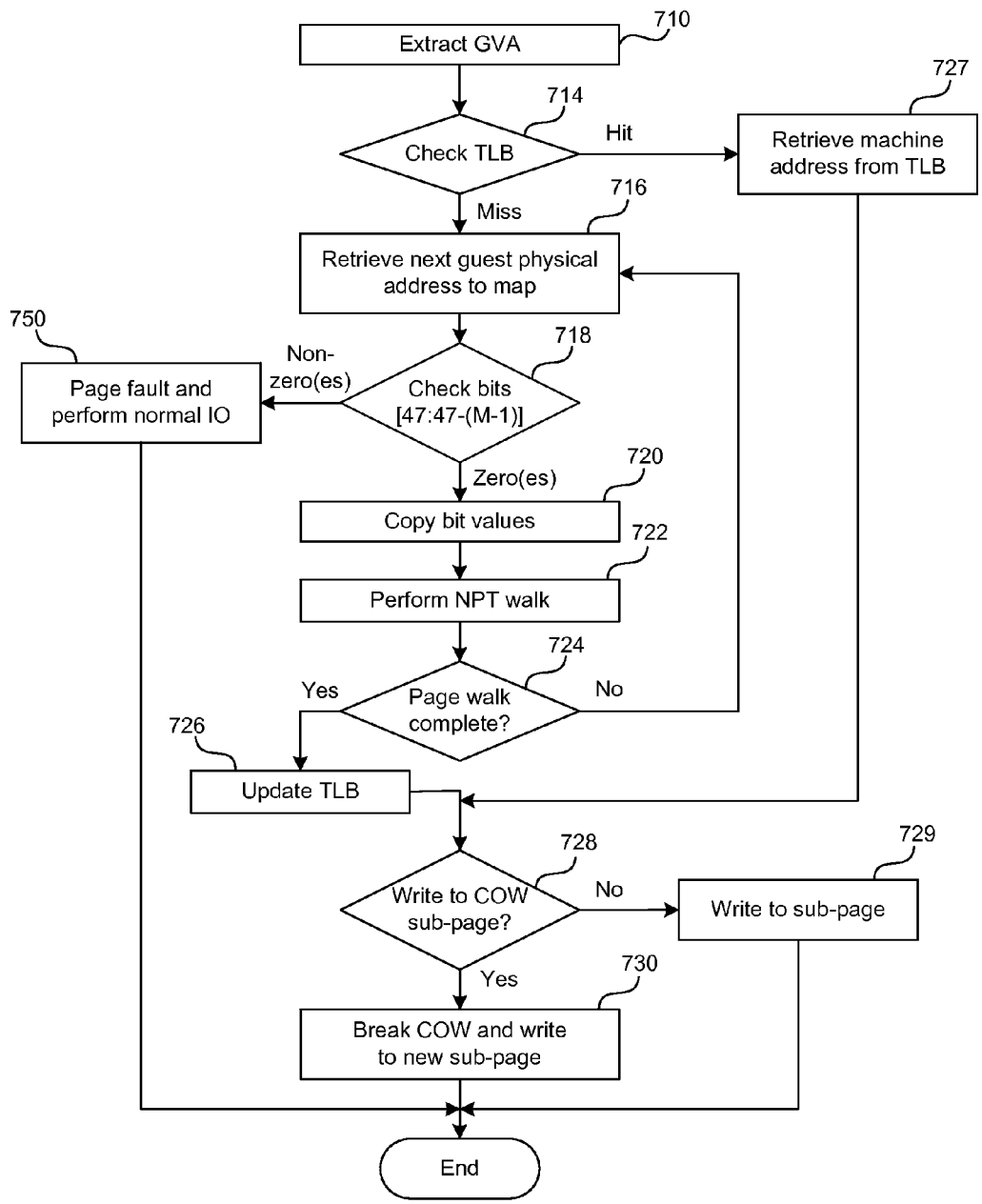
FIG. 7 is a flow diagram that illustrates the method for performing a guest memory access, according to another embodiment of the present invention.

FIG. 7 is a flow diagram that illustrates the method for performing a guest memory access, according to another embodiment of the present invention. The guest memory access may be a read memory access or a write memory access. In the embodiment illustrated herein, the MMU (e.g., MMU 231b) is performing the mapping using TLB (e.g., TLB 232b) or page tables (e.g., page tables 233a, 233b).

At step 710, the MMU extracts the guest virtual address contained in the guest memory access in binary form. The TLB is then checked at step 714. If there is a TLB hit, the corresponding machine address is retrieved from the TLB (step 727) and step 728 is executed thereafter. If there is a TLB miss, the loop including steps 716, 718, 720, 722, and 724 is executed to carry out the guest and nested page table walks. After the guest and nested page walks, the TLB is updated at step 726. At step 728, the MMU determines whether or not the guest memory access is a write memory access to a portion of the data page (referred to hereinafter as a "sub-page") that has been designated copy-on-write by examining the read/write bit of the entry in the TLB or the page table, that includes a pointer to (i.e., an address of) the data page. If the read/write bit is set as '1' indicating that a write to the sub-page is permitted, step 729 is carried out and the write memory access is carried out in the normal manner. On the other hand, if the read/write bit is set as '0' indicating that a write to the sub-page is not permitted, step 730 is carried out. At step 730, the VMM causes the read-only portion of the contents of the sub-page to be copied to a new sub-page memory location, and the pointer to the sub-page stored in the page tables and the TLB is changed to the address of the new sub-page memory location. In addition, R/W bit 443 of the corresponding page table and TLB entry is changed from '0' to '1' and a write memory access is carried out on the new sub-page.

The guest and nested page walks begin with the MMU accessing the guest physical address stored in gCR3 at step 716. During subsequent passes through the loop, the guest physical addresses are retrieved from machine memory addresses obtained from the nested page walks carried out at step 722. At step 718, the MMU examines bits [47:47-(M−1)] of the guest physical address retrieved at step 716 for zeroes. If one or more of the bits [47:47-(M−1)] are not zero, the MMU issues a page fault and the guest memory access is performed in a conventional manner (step 750), and the method terminates thereafter. On the other hand, if bits [47:47-(M−1)] are all zeroes, the MMU copies bit values at bits [20:20-(M−1)] into bits [47:47-(M−1)] at step 720 to produce the guest physical address that is to be translated into a machine address through the nested page walk at step 722. After nested page walk is executed at step 722, step 724 is carried out to determine if the guest and nested page walks are complete (e.g., the machine memory address of the data page corresponding to the guest virtual address to be mapped is obtained). If the guest and nested page walks are not complete, the flow returns to step 716 where the next guest physical address to be mapped is retrieved. If the guest and nested page walks are complete, the TLB is updated at step 726, and step 728 is executed thereafter as described above.

The various embodiments described herein may employ various computer-implemented operations involving data stored in computer systems. For example, these operations may require physical manipulation of physical quantities which usually, though not necessarily, take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the description provided herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system; computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD-ROM (Compact Disc-ROM), a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A computer system comprising:
a memory management unit to manage mappings of virtual addresses to physical memory pages, the memory management unit using a data structure that includes a set of page tables that are hierarchically arranged, the set of page tables including a root page table and a plurality of lower-level page tables,
wherein
an entry of the lower-level page tables references a physical memory page in common with at least one other entry of the lower-level page tables,
the two entries respectively correspond to first and second binary representations of a virtual address, the second binary representation being the same as the first binary representation except that the second binary representation has at least one bit in a second bit position in the second binary representation that is a copy of at least one bit in a first bit position in the second binary representation, the second bit position in the second binary representation being more significant than the first bit position in the second binary representation, and
the entries each have an address value of the physical memory page and a bit value indicating that the address value is referencing a data page and not a location of another lower-level page table.

2. The computer system of claim 1, wherein one of the entries has a bit value indicating that the referenced physical memory page is read-only and the other one of the entries has a bit value indicating that the referenced physical memory page is read/write.

3. The computer system of claim 1, wherein the two entries of the lower-level page tables that reference the same physical memory page are associated with at least two different virtual addresses.

4. The computer system of claim 3, wherein the two entries respectively correspond to a virtual address whose binary representation has a 0 as its 20th least significant bit and a virtual address whose binary representation has a 1 as its 20th least significant bit.

5. The computer system of claim 3, wherein the two entries respectively correspond to a virtual address whose binary representation has a 0 as its 16th least significant bit and a virtual address whose binary representation has a 1 as its 16th least significant bit.

6. A computer system having virtual machines instantiated therein, the computer system comprising:
a memory management unit (MMU) configured to execute a first mapping from a guest virtual address space to a guest physical address space and a second mapping from the guest physical address space to a machine memory address space, the MMU using a data structure including:
a set of first mapping page tables that are hierarchically arranged and define mappings between guest virtual addresses and guest physical addresses; and
a set of second mapping page tables that are hierarchically arranged and define mappings between guest physical addresses and machine memory addresses, the set of second mapping page tables including a root page table and a plurality of lower-level page tables,
wherein an entry of the lower-level page tables references a machine memory page in common with at least one other entry of the lower-level page tables, the two entries respectively correspond to first and second binary representations of a virtual address, the second binary representation being the same as the first binary representation except that the second binary representation has at least one bit in a second bit position in the second binary representation that is a copy of at least one bit in a first bit position in the second binary representation, the second bit position in the second binary representation being more significant than the first bit position in the second binary representation, and the entries each have an address value of the machine memory page and a bit value indicating that the address value is referencing a data page and not a location of another lower-level page table.

7. The computer system of claim 6, wherein one of the entries has a bit value indicating that the referenced machine memory page is read-only and the other one of the entries has a bit value indicating that the referenced machine memory page is read/write.

8. The computer system of claim 6, wherein the two entries of the lower-level page tables that reference the same machine memory page are associated with at least two different guest physical addresses.

9. The computer system of claim 8, wherein the two entries respectively correspond to a guest physical address whose binary representation has a 0 as its 20th least significant bit and a guest physical address whose binary representation has a 1 as its 20th least significant bit.

10. The data structure computer system of claim 8, wherein the two entries respectively correspond to a guest physical address whose binary representation has a 0 as its 16th least significant bit and a guest physical address whose binary representation has a 1 as its 16th least significant bit.

11. A method of performing a write operation in a computer system having virtual machines instantiated therein, comprising:
receiving a write operation from a virtual machine; extracting a write target address from the write operation; modifying a binary representation of the write target address by copying the value of a first bit of the binary representation to a second bit of the binary representation, wherein the second bit is more significant than the first bit;
translating the write target address to a machine memory address using the modified binary representation;
determining that the write operation at the machine memory address is not permitted;
copying the contents at the machine memory address to a different machine memory address and designating the different machine memory address to be writable; and
performing the write operation at the different memory address.

12. The method of claim 11, wherein said translating includes: traversing shadow page tables to obtain the machine memory address.

13. The method of claim 12, wherein an entry of the shadow page tables includes the machine memory address and a bit value indicating that the machine memory address is read-only.

14. The method of claim 13, wherein upon said copying: updating the entry by replacing the machine memory address with the different machine memory address and setting the bit value to indicate that the different machine memory address is read/write.

15. The method of claim 14, wherein another entry of the shadow page tables includes the machine memory address and a bit value indicating that the machine memory address is read/write.

16. The method of claim 11, wherein said translating includes: performing a translation look-aside buffer look-up.

17. The method of claim 11, wherein said translating includes: traversing guest and nested page tables to obtain the machine memory address.

18. The method of claim 17, wherein an entry of the nested page tables includes the machine memory address and a bit value indicating that the machine memory address is read-only.

19. The method of claim 18, wherein upon said copying: updating the entry by replacing the machine memory address with the different machine memory address and setting the bit value to indicate that the different machine memory address is read/write.

20. The method of claim 19, wherein another entry of the nested page tables includes the machine memory address and a bit value indicating that the machine memory address is read/write.

21. A computer system having virtual machines instantiated therein, the computer system comprising: a processor coupled to a memory, the processor programmed to perform a write operation to the memory by:
receiving the write operation from a virtual machine;
extracting a write target address from the write operation;
modifying a binary representation of the write target address by copying the value of a first bit of the binary representation to a second bit of the binary representation, wherein the second bit is more significant than the first bit;
translating the write target address to a machine memory address using the modified binary representation;
determining that the write operation at the machine memory address is not permitted;
copying the contents at the machine memory address to a different machine memory address and designating the different machine memory address to be writable; and
performing the write operation at the different memory address.

22. A non-transitory computer readable medium comprising instructions, which when executed in a computer system having virtual machines instantiated therein, causes the computer system to carry out a method of performing a write operation, comprising:
receiving a write operation from a virtual machine;
extracting a write target address from the write operation;
modifying a binary representation of the write target address by copying the value of a first bit of the binary representation to a second bit of the binary representation,
wherein the second bit is more significant than the first bit;
translating the write target address to a machine memory address using the modified binary representation;
determining that the write operation at the machine memory address is not permitted;
copying the contents at the machine memory address to a different machine memory address and designating the different machine memory address to be writable; and
performing the write operation at the different memory address.

* * * * *